Patented Apr. 26, 1927.

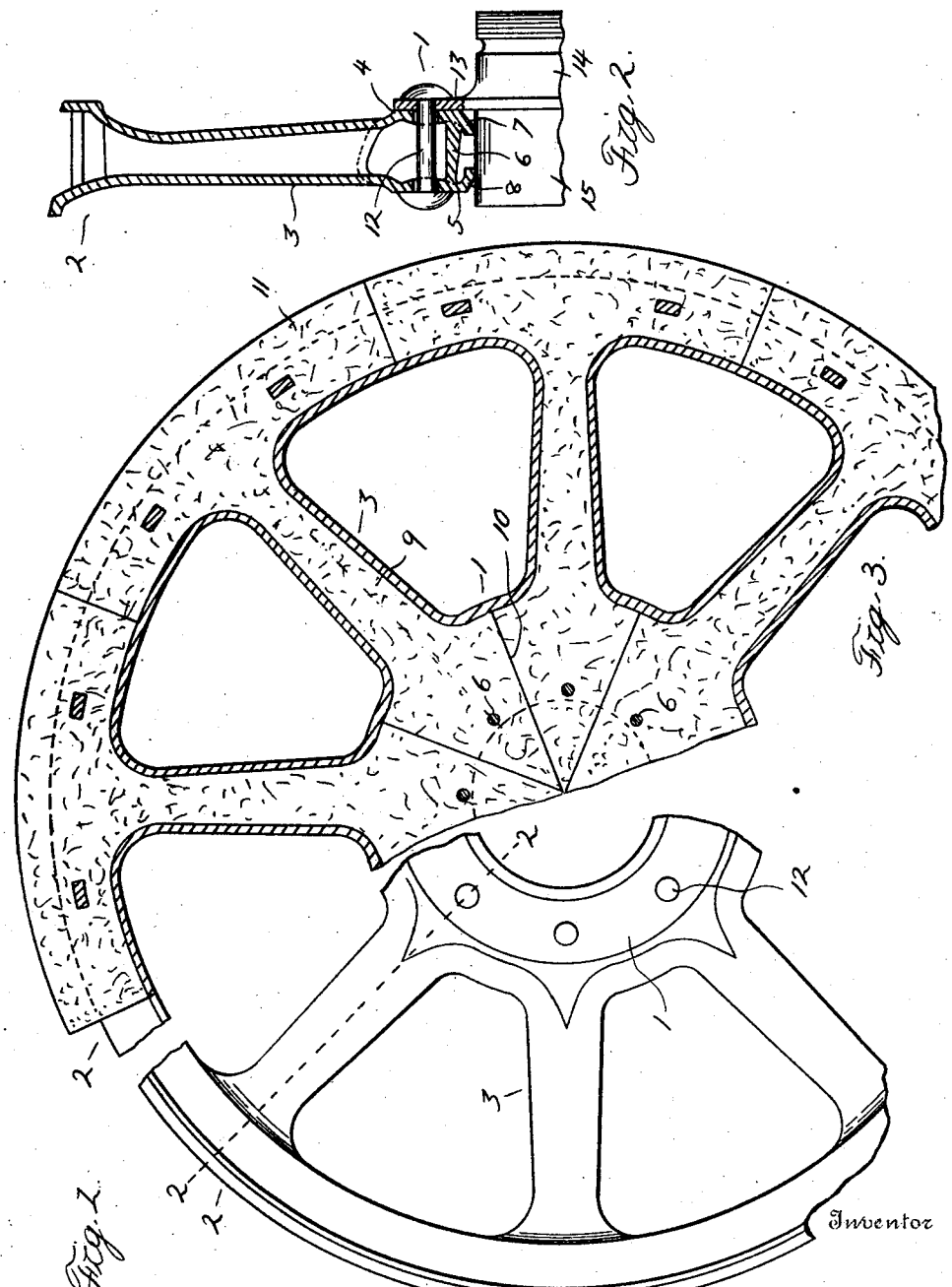

1,626,211

UNITED STATES PATENT OFFICE.

NED S. REED, OF DETROIT, MICHIGAN, ASSIGNOR TO PAIGE-DETROIT MOTOR CAR COMPANY, OF DETROIT, MICHIGAN, A CORPORATION OF MICHIGAN.

CAST-WHEEL CONSTRUCTION.

Application filed April 27, 1925. Serial No. 26,264.

The invention relates to cast wheel constructions and has for one of its objects the provision of a construction of wheel which may be formed of malleable iron. Another object is the provision of a construction of wheel adapted to be mounted upon a hub and having hollow spokes and a hollow hub section so arranged that the mould cores may be supported at both ends. Further objects of the invention reside in the novel features of construction and combinations and arrangements of parts as more fully hereinafter set forth:

In the drawings:

Figure 1 is a side elevation of a cast wheel embodying my invention.

Figure 2 is a cross section on the line 2—2 of Figure 1.

Figure 3 is a cross section in the central plane of the wheel and showing the mould cores in place.

The cast wheel, which is formed of malleable iron, comprises the hub section 1, the felly section 2 and the series of spokes 3 integral with and connecting the hub and felly sections. The hub section 1 is hollow and has the front and rear walls 4 and 5, respectively, the outer faces of which are parallel. The spokes 3 are hollow and communicate directly with the interior of the hub section as well as with the interior of the felly section, which is channel shaped. To re-enforce the hub section I have provided the transverse cross bars 6 integral with the front and rear walls 4 and 5, respectively, connecting thereinto radially outward beyond the converging inner edge or terminal portions 7 and 8, respectively, upon the front and rear walls 4 and 5.

For the purpose of supporting the mould cores at both ends the inner end of the hub section 1 is formed with a continuous space between the ends of the converging terminal portions 7 and 8 of the hub section walls so that the cores 9 as shown in Figure 3 extend at their inner ends beyond the inner edge of the hub section 1 and at their outer ends beyond the outer edge of the felly section 2. These cores have at their inner ends the bevelled end portions 10, the lateral edges of which abut and also have at their outer ends the arcuate portions 11, the lateral edges of which abut. Thus, with this arrangement the cores will be supported at their opposite ends beyond their bevelled end portions and arcuate portions so that the walls of the hub section, the spokes and felly section will be of uniform thickness.

The wheel is secured to the wheel hub by suitable means such as the rivet elements 12, which extend through the hub section 1 and the annular flange 13, which is fixed upon the wheel hub 14. The front wall 4 of the hub section is held in contact with the wheel hub flange and the converging wall portions at the inner edge of the hub section preferably contact with the barrel 15 of the wheel hub.

What I claim as my invention is:

1. A cast wheel, including hollow spokes, and a hollow hub section integral with said spokes with the interiors of said spokes and hub communicating, said hub section having side walls continuously spaced from each other with their inner terminal edges converging.

2. A cast wheel, including spokes hollow throughout their extent and a hollow hub section integral with said spokes and having side walls continuously spaced from each other at their inner terminal edges and cross bars integral with said side walls and connected thereinto adjacent to their inner terminal edges.

3. A cast wheel, comprising a channel shaped felly section, a hollow hub section and hollow spokes integral with and connecting said felly and hub sections, the interiors of said spokes communicating with the interiors of said felly and hub sections and said felly section opening radially outward and said hub section having a continuous opening at its inner edge.

4. The combination with a wheel hub having an annular flange secured thereto and a cast wheel including a felly section opening radially outwardly, hollow spokes and a hollow hub section integral with said spokes and having spaced side walls with a continuous space between their inner terminal edges, the interiors of said spokes, felly and hub communicating and means for securing said cast wheel to said wheel hub including securing elements extending through said hub section and secured to said annular flange.

In testimony whereof I affix my signature.

NED S. REED.